(12) United States Patent
Ozeki

(10) Patent No.: US 8,628,367 B2
(45) Date of Patent: Jan. 14, 2014

(54) METHOD FOR MEASURING DEVIATION OF JOINT POSITION OF MEMBER AND METHOD FOR PRODUCING SPARK PLUG

(75) Inventor: Atsushi Ozeki, Seto (JP)

(73) Assignee: NGK Spark Plug., Co., Ltd., Nagoya (JP)

(*) Notice: Subject to any disclaimer, the term of this patent is extended or adjusted under 35 U.S.C. 154(b) by 152 days.

(21) Appl. No.: 13/147,498

(22) PCT Filed: Feb. 2, 2010

(86) PCT No.: PCT/JP2010/000602
§ 371 (c)(1),
(2), (4) Date: Aug. 2, 2011

(87) PCT Pub. No.: WO2010/089992
PCT Pub. Date: Aug. 12, 2010

(65) Prior Publication Data
US 2011/0287683 A1    Nov. 24, 2011

(30) Foreign Application Priority Data
Feb. 4, 2009   (JP) .................................. 2009-024110

(51) Int. Cl.
*H01T 21/02* (2006.01)
*G01B 11/14* (2006.01)
(52) U.S. Cl.
USPC .............................................. 445/7; 356/614
(58) Field of Classification Search
None
See application file for complete search history.

(56) References Cited

U.S. PATENT DOCUMENTS

2008/0238282 A1   10/2008   Kato et al.

FOREIGN PATENT DOCUMENTS

| JP | 09-212651 A | 8/1997 |
|---|---|---|
| JP | 2002-141156 A | 5/2002 |
| JP | 2004-253377 A | 9/2004 |
| JP | 2007-080638 A | 3/2007 |
| JP | 2008-243713 A | 10/2008 |

OTHER PUBLICATIONS

International Search Report mailed May 11, 2010 for the corresponding PCT application No. PCT/JP2010/000602.

*Primary Examiner* — Britt D Hanley
(74) *Attorney, Agent, or Firm* — Leason Ellis LLP.

(57) ABSTRACT

In a method for measuring deviation of a ground electrode from an optimal igniting position, a metallic shell is engaged with a female thread jig. Then the axis O of the metallic shell, a predetermined first measuring point P1 and a predetermined second measuring point P2 on a front end face of the ground electrode are detected. Then, a circumferential angle β1 formed between a reference straight line "LS" connecting O to the optimal igniting position O1, and a first straight line L1 which connects O to P1 is measured, followed by a measurement of a circumferential angle β2 formed between LS and a second straight line L2 connecting O to P2 Thereafter, the deviation of the ground electrode from O1 is measured as a circumferential angle "α" between "LS" and a third straight line L3 connecting the axis O to the center C of the front end face.

11 Claims, 12 Drawing Sheets

(a)

(b)

(a)

(b)

(a)

(b) Enlarged view of X

METHOD FOR MEASURING DEVIATION OF JOINT POSITION OF MEMBER AND METHOD FOR PRODUCING SPARK PLUG

CROSS-REFERENCE TO RELATED PATENT APPLICATIONS

This application is a U.S. National Phase Application under 35 U.S.C. §371 of International Patent Application No PCT/JP2010/000602, filed Feb. 2, 2010, and claims the benefit of Japanese Patent Application No. 2009-024110, filed Feb. 4, 2009, all of which are incorporated by reference herein. The International Application was published in Japanese on Dec. 8, 2010 as International Publication No. WO/2010/089992 under PCT Article 21(2).

FIELD OF THE INVENTION

The present invention relates to a method for measuring a deviation of a member joined to a measuring object from a joint target position using a female thread jig, particularly a deviation of an electrode position of a spark plug, and further relates to a method for manufacturing a spark plug which adapts said measuring method.

BACKGROUND OF THE INVENTION

A metallic shell of a spark plug has a center electrode and a ground electrode which are positioned so as to face each other having a space, called a spark gap, therebetween. Recently, in order to further improve fuel consumption, the ground electrode is joined to the metallic shell in an optimal igniting position when the spark plug is mounted on an internal combustion engine with a specified torque. Notably, the "optimal igniting position" means a location where a growth of flame kernel generated by spark discharge in the spark gap is not interfered by airflow of an air-fuel mixture in a combustion chamber.

Generally, in order to check a joint position of a ground electrode, a female thread jig assuming the same shape as a female thread of a cylinder head of an internal combustion engine for mounting a spark plug is employed. In the situation where the metallic shell is engaged with a female thread, an allowable angle range for joining the ground electrode is indicated in such a female thread jig. The allowable angle range means an allowable deviation (angle) when the ground electrode is deviated from the optimal igniting position. A person who checks the deviation of the ground electrode engages the metallic shell with the female thread jig with the same torque as that used for mounting a spark plug on a cylinder head. Then, the person conducts a visual inspection to see whether or not the location of the ground electrode is in the allowable angle range and inspect quality of a product (metallic shell).

PRIOR ART DOCUMENT

Patent Documents

[Patent Document 1] Japanese Patent Application Laid-Open (kokai) No. 2002-141156

SUMMARY OF THE INVENTION

Conventionally, a person judges quality whether or not a position of a ground electrode is in an allowable angle range. However, no objective numerical evaluation of a deviation from an optimal igniting position of the ground electrode was inspected. On the occasions of the quality check and an accuracy check of manufacturing equipment for a spark plug based on a variation in products, the objective numerical evaluation of the deviation has been required, in addition to the judgment whether or not the position of the ground electrode is within the allowable angle range.

Moreover, when the ground electrode is positioned near the upper or lower limit of the allowable angle range, the visual inspection result may be different according to each inspector. Even though the position of the ground electrode is the same, an accept/reject judgment tends to be inconsistent according to an inspector. This causes deterioration in measurement accuracy of the deviation and variation in quality.

The above-mentioned problems are common not only for a metallic shell of spark plugs but also for various products having a member joined to a predetermined location thereof.

The present invention has been achieved in view of the above-mentioned problems, and an object of the present invention is to improve measurement accuracy of a deviation from a joint target position of a member joined to a measuring object.

The present invention has been achieved in Order to solve at least a part of the above problems, and the present invention can be realized in the following mode or aspect.

[Aspect 1]

A method for measuring a deviation of a member from a joint target position comprising: a measuring object having an end face and to which a member is joined at a position other than an axis of the measuring object on the end face; a female thread jig having a reference surface in which a reference portion serving as a reference for the joint target position of the member in the measuring object is provided, the method further comprising: engaging the measuring object with the female thread jig; detecting at least a predetermined measuring point in a projection image of a front end portion of the member when the front end portion is projected on a flat measurement face including the reference surface while the measuring object is engaged with the female thread jig; detecting the reference portion on the measurement face; and measuring deviation of the member from the joint target position based on an angle between a straight line that connects an axis of the measuring object to the measuring point on the measurement face and a reference straight line that connects the axis of the measuring object to the reference portion on the measurement face.

According to the measuring method of Aspect 1, the deviation of the member from the joint target position is measured based on the angle between the straight line that connects the axis of the measuring object to at least one measuring point and the reference straight line that connects the axis of the measuring object to the reference portion. Therefore, the deviation of the member from the joint target position can be represented in numerical terms as a piece of angle information. Thus, an accurate evaluation of the deviation of the joint target position of the member is achievable, and a variation in quality of the measuring object can be prevented.

[Aspect 2]

In the measuring method according to Aspect 1, wherein the measuring object is a metallic shell for spark plugs, and wherein the member is a ground electrode joined to the metallic shell. According to the measuring method of Aspect 2, the deviation from the joint target position of the ground electrode that is joined to the metallic shell for a spark plug can be accurately measured. Therefore, the variation in quality of the metallic shell can be prevented.

[Aspect 3]

In the measuring method of Aspect 1 or Aspect 2, wherein measuring points include a predetermined first measuring point and a second measuring point on an outer edge of the projection image of the front end portion, wherein, in a measurement of the deviation, calculating a center of the projection image of the front end portion based on: a piece of first angle information representing an angle between the reference straight line and the first straight line that connects the axis of the measuring object and the first measuring point; and a piece of second angle information representing an angle between the reference straight line and the second straight line that connects the axis of the measuring object and the second measuring point, finding a third straight line that connects the axis of the measuring object to the thus-calculated center of the projection image of the front end portion, and measuring the deviation of the member from the joint target position based on a third angle information representing an angle between the reference straight line and the third straight line. According to the measuring method of Aspect 3, the center of the projection image of the front end portion is calculated based on the first angle information and the second angle information, as well as finding the third straight line that connects the axis of the measuring object to the center of the projection image. Further, the deviation of the member from the joint target position is measured based on the third angle information representing an angle between the reference straight line and the third straight line. Therefore, the center of the projection image of the front end portion is accurately calculated. As a result, improvement in measurement accuracy of the deviation of the member from the joint target position is achievable.

[Aspect 4]

In the measuring method of Aspect 3, the projection image of the front end portion assumes approximately rectangular shape having four vertices, and the first measuring point and the second measuring point are close to the axis of the measuring object in the four vertices of the projection image of the front end portion. According to the measuring method of Aspect 4, two points that are close to the axis of the measuring object in the four vertices of the projection image of the front end portion are detected as the measuring points. Thus, a distance between the axis of the female thread jig and the first measuring point and a distance between the axis of the female thread jig and the second measuring point are mostly the same. That is, since the first measuring point and the second measuring point are generally positioned on a concentric circle, the angle information is accurately obtained. Therefore, the measurement accuracy of the deviation can be improved.

[Aspect 5]

In the measuring method of Aspect 3, the first straight line and the second straight line are circumscribed in different locations on the outer edge of the projection image of the front end portion, respectively. According to the measuring method of Aspect 5, the first measuring point and the second measuring point are detected as contact points where the first straight line and the second straight line are circumscribed in the different locations on the outer edge of the projection image of the front end portion. Therefore, even though the outer edge of the projection image of the front end portion does not have a corner, each angle information can be obtained with sufficient accuracy. Thus, the accuracy of the measurement of the deviation can be improved.

[Aspect 6]

The measuring method in anyone of Aspects 1 to 5 further detect the axis of the measuring object before the measurement of the deviation of the member from the joint target position, based on a chamfered portion that is formed in a boundary of the reference surface of the female thread jig and a thread hole. According to the measuring method of Aspect 6, the axis is detected based on the chamfered portion formed in the boundary of the reference surface of the female thread jig and the thread hole. Because there is the chamfered portion, a shadow thereof is reflected on the measurement face which leads to an improvement in the detection accuracy of the circular edge centering on the axis. Therefore, the detection accuracy of the axis can be improved.

[Aspect 7]

In the measuring methods of Aspect 1 to 6, wherein, in the engagement step, the measuring object is engaged with the female thread jig with a predetermined torque. According to the measuring method of Aspect 7, the measuring object is engaged with the female thread jig with the same torque as is used at the time of mounting the measuring object on a mounting device. Therefore, the deviation of the member from the joint target position can be measured in the generally same state where the measuring object is mounted on a mounting device. As a result, the measurement accuracy of the deviation can be improved.

[Aspect 8]

A method for manufacturing a spark plug comprising: joining a ground electrode to an end face of a cylindrical metallic shell; engaging the metallic shell joined to the ground electrode with a female thread jig having a reference surface where a reference portion that serves as a reference of a joint target position of the ground electrode in the metallic shell is formed beforehand; detecting at least one predetermined measuring point in a projection image of a front end portion of the ground electrode when the front end portion is projected on a flat measurement face including the reference surface while the metallic shell is engaged with the female thread jig; detecting the reference portion on the measurement face; measuring a deviation of the member from the joint target position is measured based on an angle between a straight line that connects the axis of the metallic shell to the measuring point on the measurement face and a reference straight line that connects the axis of the measuring object to the reference portion on the measurement face; judging whether or not the measured deviation is within a predetermined allowable range; fitting an insulator where a center electrode and a terminal fitting are assembled to the metallic shell in which the deviation is judged to be within the allowable range; and forming a front end of the ground electrode so as to face the center electrode.

According to the manufacturing method of Aspect 8, the spark plug is manufactured in such a manner that the deviation of the electrode from the joint target position is measured based on the angle between the straight line that connects the axis of the metallic shell to at least one measuring point and the reference straight line that connects the axis to the reference portion. Further, the insulator is joined to the metallic shell in which the deviation is judged to be within the allowable range. Therefore, variation in quality of the spark plug can be prevented.

In the present invention, various modes mentioned above can be suitably combined, or a part thereof can be omitted.

BRIEF DESCRIPTION OF THE DRAWINGS

These and other features and advantages of the present invention will become more readily appreciated when considered in connection with the following detailed description and appended drawings, wherein like designations denote like elements in the various views, and wherein.

DETAILED DESCRIPTION OF THE INVENTION

A. First Embodiment

Figure 1:
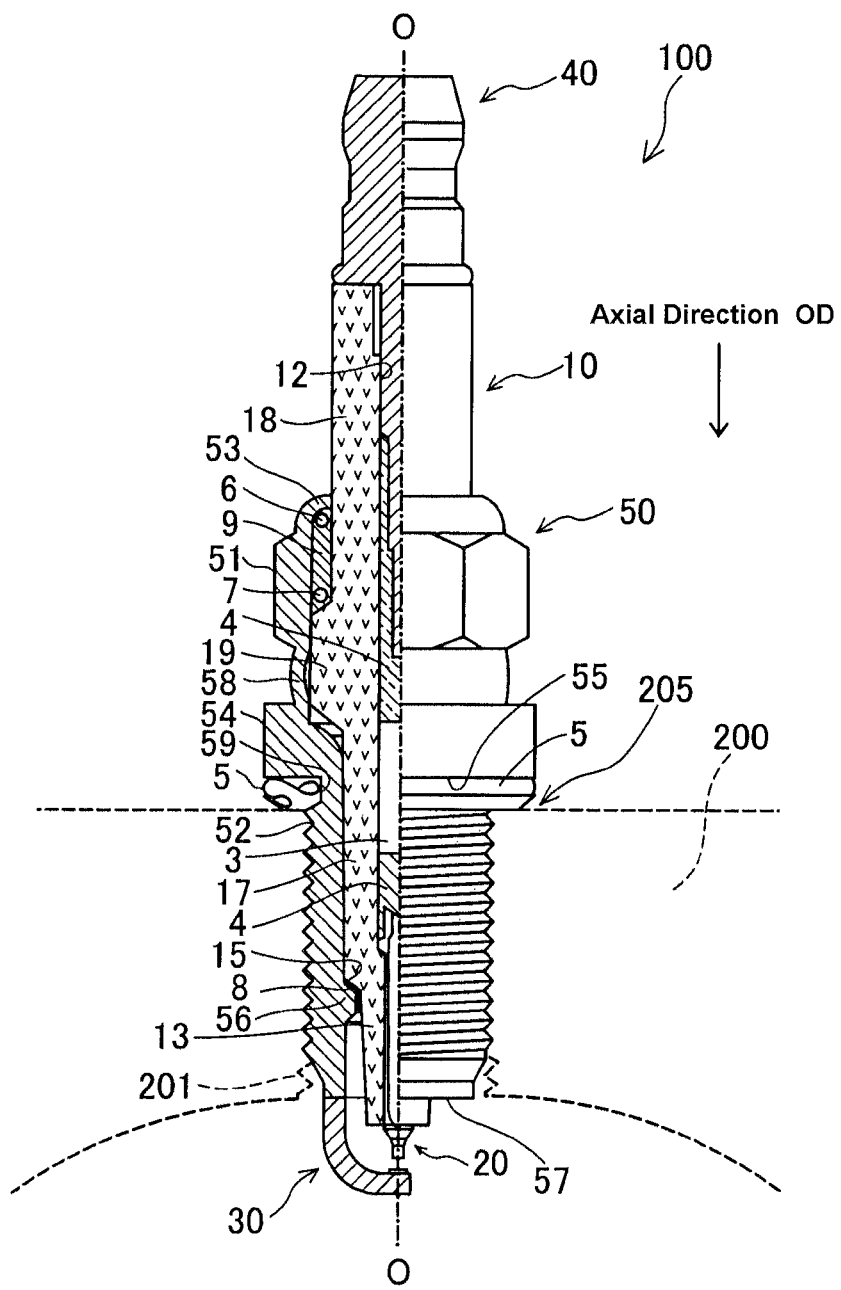
FIG. 1 is a partially sectioned view of a spark plug 100 according to a first embodiment.

A1. Composition of Spark Plug:

Hereafter, an embodiment of the present invention will be described. FIG. 1 is a partially sectioned view of a spark plug 100 according to a first embodiment. Notably, in FIG. 1, the spark plug 100 is depicted in such a manner that an axial direction OD of the spark plug 100 coincide with the vertical direction in FIG. 1. Further, in the following description, the lower side of FIG. 1 will be referred to as a front end side of the spark plug 100, and the upper side of FIG. 1 will be referred to as a rear end side of the spark plug 100.

As shown in FIG. 1, the spark plug 100 is comprised of a ceramic insulator 10 serving as an insulator, a metallic shell 50 holding therein the ceramic insulator 10, a center electrode 20 held in the ceramic insulator 10 in the axial direction OD, a ground electrode 30, and a terminal fitting 40 formed in the rear end portion of the ceramic insulator 10.

As is well known, the ceramic insulator 10 is made of alumina or the like through firing and has a tubular shape such that an axial hole 12 extends therethrough coaxially along the axial direction OD. The ceramic insulator 10 has a flange portion 19 having the largest outside diameter and located substantially at the center with respect to the axial direction OD and a rear trunk portion 18 located rearward (upward in FIG. 1) of the flange portion 19. The ceramic insulator 10 also has a front trunk portion 17 smaller in outside diameter than the rear trunk portion 18 and located frontward (downward in FIG. 1) of the flange portion 19, and a leg portion 13 smaller in outside diameter than the front trunk portion 17 and located frontward of the front trunk portion 17. The leg portion 13 is reduced in diameter in the frontward direction and is exposed to a combustion chamber of an internal combustion engine when the spark plug 100 is mounted to an engine head 200 of the engine. A step portion 15 is formed between the leg portion 13 and the front trunk portion 17.

The metallic shell 50 of the spark plug 100 is a cylindrical tubular metallic member which surrounds and holds a portion of the insulator 10 extending from the rear trunk portion 18 to the leg portion 13, and, in the present embodiment, is formed of low carbon steel. The metallic shell 50 includes a tool engagement portion 51 for fitting to a spark plug wrench (not illustrated) and a mount screw portion 52 where screw threads are formed thereon for engaging the spark plug 100 with a threaded mounting hole 201 of the engine head 200 located in an upper portion of a combustion chamber.

The metallic shell 50 has a flange-like seal portion 54 formed between the tool engagement portion 51 and the mount screw portion 52. An annular gasket 5 formed by folding a sheet is fitted to a screw neck 59 between the mount screw portion 52 and the seal portion 54. When the spark plug 100 is mounted to the engine head 200, the gasket 5 is crushed and deformed between a seat surface 55 of the seal portion 54 and a peripheral surface 205 around the opening of the thread mounting hole 201. The deformation of the gasket 5 provides a seal between the spark plug 100 and the engine head 200, thereby ensuring gastightness within an engine via the thread mounting hole 201.

The metallic shell 50 has a thin-walled crimp portion 53 located rearward of the tool engagement portion 51. The metallic shell 50 also has a buckle portion 58, which is thin-walled similar to the crimp portion 53, between the seal portion 54 and the tool engagement portion 51. Annular ring members 6, 7 intervene between an outer circumferential surface of the rear trunk portion 18 of the ceramic insulator 10 and an inner circumferential surface of the metallic shell 50 extending from the tool engagement portion 51 to the crimp portion 53. Further, a space between the two ring members 6, 7 is filled with powder of talc 9. When the crimp portion 53 is crimped inward, the ceramic insulator 10 is pressed frontward within the metallic shell 50 via the ring members 6, 7 and the talc 9. Accordingly, the stepped portion 15 of the ceramic insulator 10 is supported by a stepped portion 56 formed on the inner circumference of the metallic shell 50, whereby the metallic shell 50 and the ceramic insulator 10 are united together. At this time, gastightness between the metallic shell 50 and the ceramic insulator 10 is maintained by means of an annular sheet packing 8 which intervenes between the stepped portion 15 of the ceramic insulator 10 and the stepped portion 56 of the metallic shell 50, thereby preventing outflow of combustion gas. The buckle portion 58 is designed to be deformed outwardly in association with application of compressive force in a crimping process, thereby contributing toward increasing the stroke of compression of the talc 9 and thus enhancing gastightness within the metallic shell 50. A clearance having a predetermined dimension is provided between the ceramic insulator 10 and a portion of the metallic shell 50 located frontward of the step portion 56.

In a front end face 57 of the metallic shell 50 positioned at the front end side, the ground electrode 30 is joined to a portion other than the axis O of the metallic shell 50. In the circumferential direction centering on the axis direction OD of the spark plug 100, the ground electrode 30 is preferably joined to a position which contributes to the maximum engine performance (hereinafter referred to as an optimal igniting position). However, the ground electrode 30 does not necessarily match with the optimal igniting position. As long as the ground electrode 30 is within a predetermined allowable angle range, it is generally accepted as a good quality. Below, the method for manufacturing the spark plug 100 will be described. The optimal igniting position means a position where a growth of a flame kernel generated by spark discharge in the spark gap is not interfered by an air current of the air-fuel mixture in a combustion chamber, i.e., a position where the flame is grown most effectively. In addition, the metallic shell 50 corresponds to a "measuring object" in the claims, the ground electrode 30 corresponds to a "member" in the claims, and the optimal igniting position corresponds to a "joint target position" in the claims.

Figure 2:
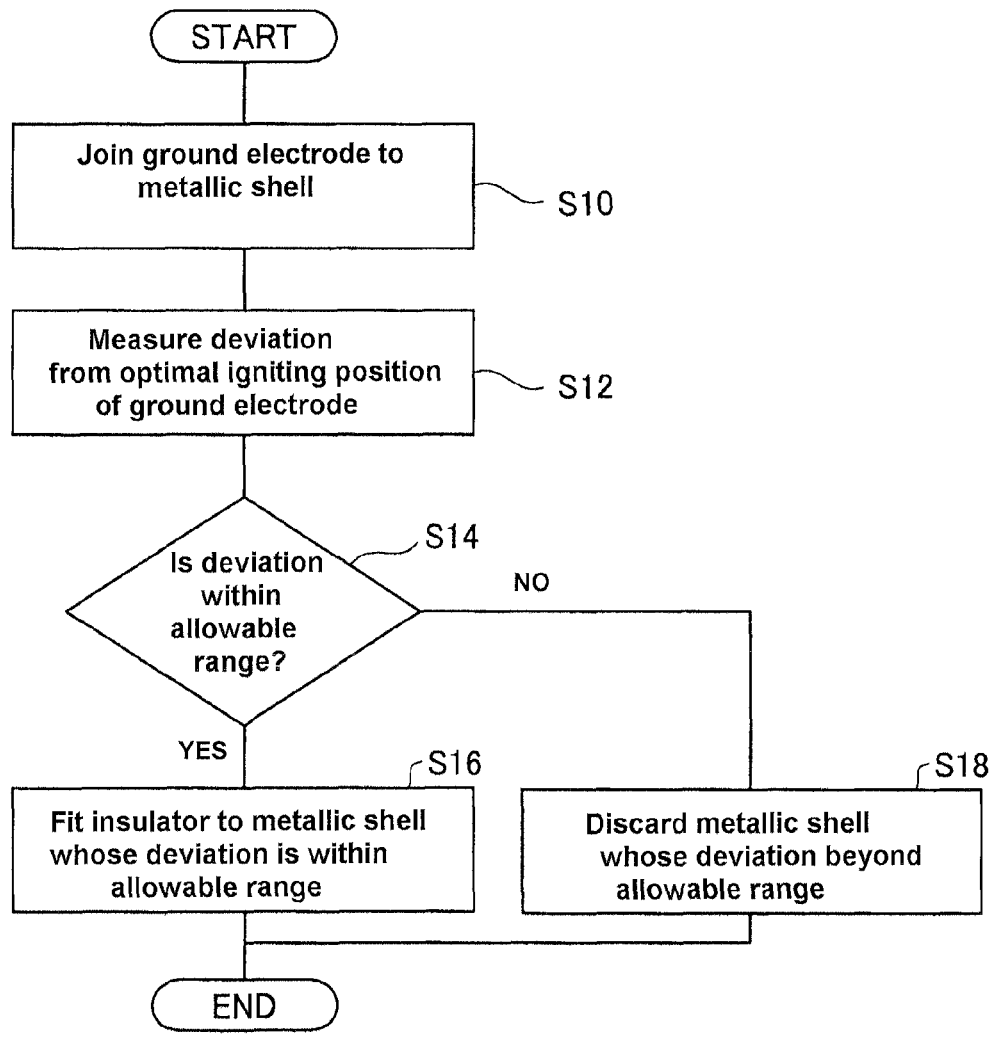
FIG. 2 is a flow chart explaining a method for manufacturing the spark plug 100 according to the first embodiment.

A2. Method for Manufacturing Spark Plug:

FIG. 2 is a flow chart explaining a method for manufacturing the spark plug 100 according to the first embodiment. The ground electrode 30 is joined to the metallic shell 50 (Step S10), and a deviation of the ground electrode 30, which is joined to the metallic shell 50, from the optimal igniting position is measured using a female thread jig (Step S12). A method for measuring the deviation will be later described in detail.

After judging whether or not the measured deviation is within a predetermined allowable range (Step S14), the insulator equipped with the center electrode 20 is assembled with the metallic shell 50. Thereafter, the ground electrode 30 is bent so as to face the center electrode 20 (Step S16). In this way, the spark plug 100 is manufactured. Any metallic shell 50 having the deviation beyond the allowable range is discarded (Step S18).

Figure 3:
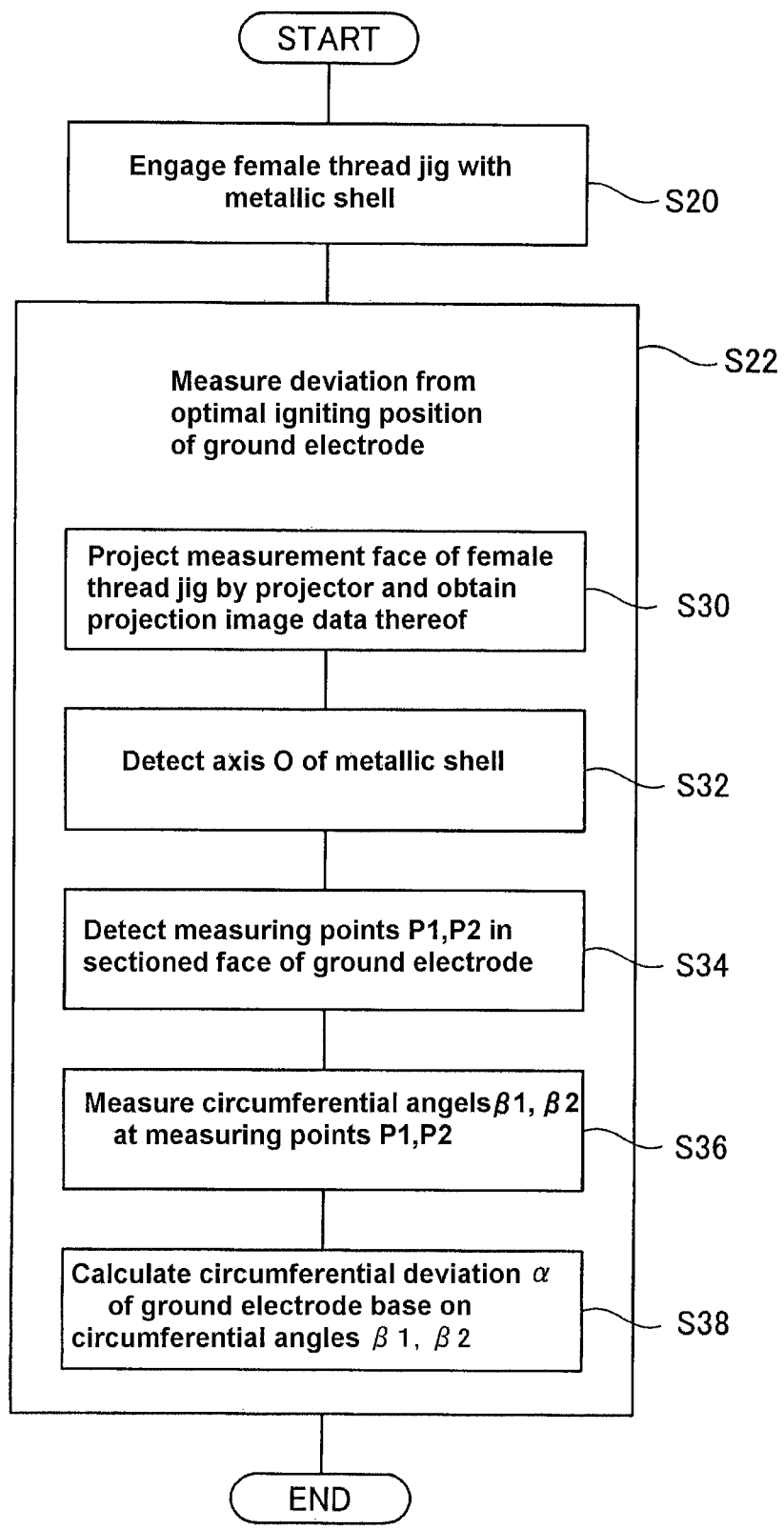
FIG. 3 is a flow chart explaining a measuring method of an deviation of the ground electrode 30 deviated from the optimal igniting position O1 according to the first embodiment.

A3. Method for measuring Deviation of Ground Electrode from Joint Target Position:

A method for measuring the deviation of the ground electrode 30 that is joined to the metallic shell 50 from the optimal igniting position will be described with reference to FIGS. 3 to 10. In the first embodiment, the deviation of the ground electrode 30 joined to the metallic shell 50 is measured using the female thread jig. FIG. 3 is a flow chart explaining the measuring method of the deviation of the ground electrode 30 from the optimal igniting position according to the first embodiment. This measuring method corresponds to S12 in FIG. 2.

The metallic shell 50 is engaged with the female thread jig 300 with the generally same torque as is used when the metallic shell 50 is mounted on an internal combustion engine (Step S20). The engagement of the metallic shell 50 with the female thread jig 300 will be described with reference to FIGS. 4 to 6.

Figure 4:
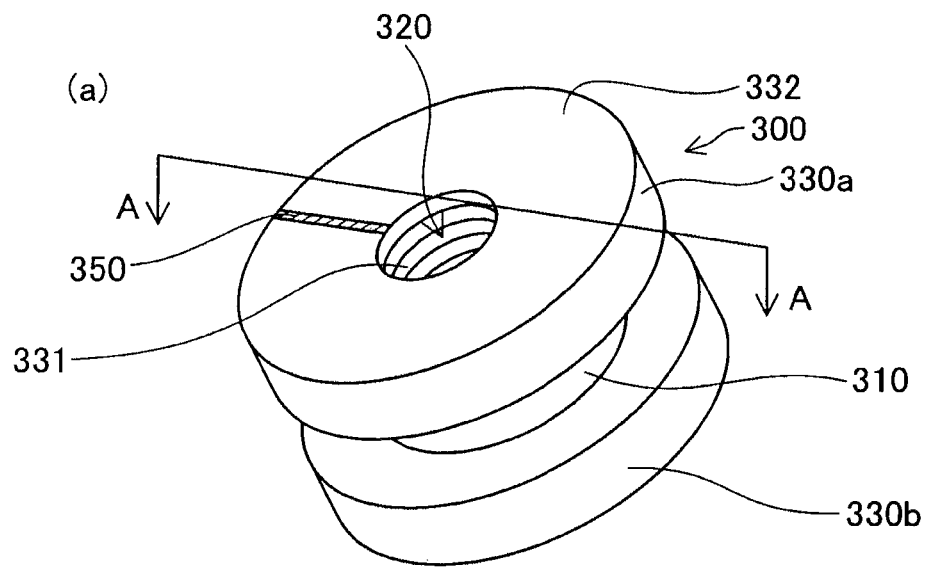
FIG. 4 is an explanatory view showing a female thread jig 300 according to the first embodiment.
Figure 4:
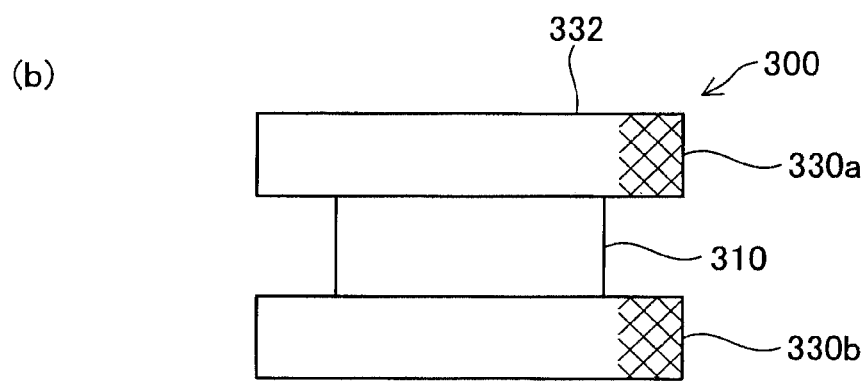

FIG. 4 is an explanatory view showing a female thread jig 300 according to the first embodiment. FIG. 4(a) is a perspective view of the female thread jig 300, and FIG. 4(b) is a side view of the female thread jig 300. As shown in FIGS. 4(a) and 4(b), the female thread jig 300 includes a main body portion 310 having a through hole 320 and flanges 330a, 330b. The flanges 330a and 330b radially outwardly bulge out from the main body portion 310 at both ends where the through hole 320 opens. A groove 350 is formed on a reference surface 332 of the flange 330a. The groove 350 is used as a reference representing the optimal igniting position of the ground electrode 30 in the state that the metallic shell 50 is engaged with the female thread jig 300. A standard female thread 331 specified by Japanese Industrial Standard B8031-1995 and used for spark plugs is formed in an inner face of the through hole 320. That is, the metallic shell 50 engaged with the female thread jig 300 is in the same state as being engaged with the internal combustion engine. Therefore, without actually mounting the spark plug 100 on an internal combustion engine, it is possible to check a state where the spark plug 100 with the metallic shell 50 is mounted on an internal combustion engine.

Figure 5:
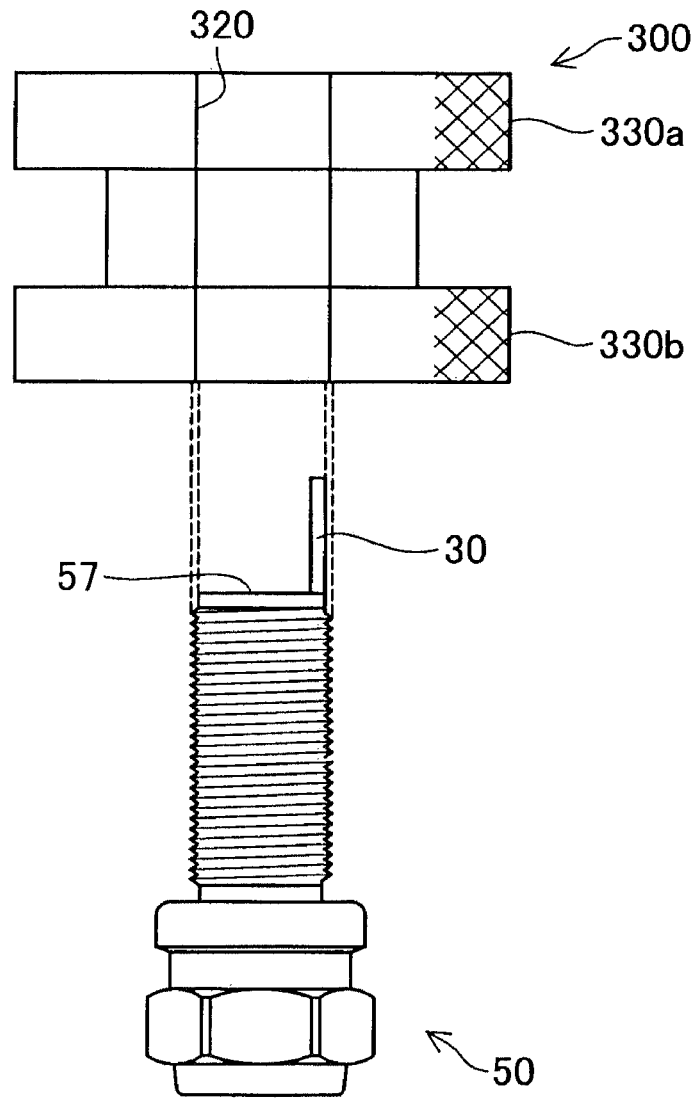
FIG. 5 is an explanatory view showing an engagement state of a metallic shell 50 and the female thread jig 300 according to the first embodiment.
Figure 5:
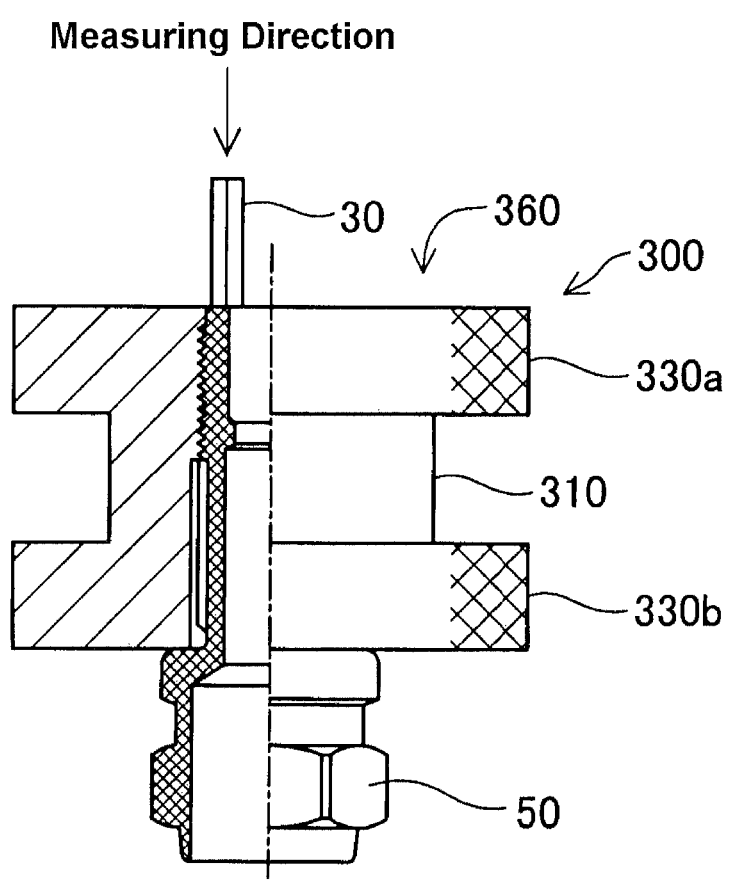

FIG. 5 is an explanatory view showing an engagement state of the metallic shell 50 and the female thread jig 300 according to the first embodiment. FIG. 5(a) shows the state before engaging the metallic shell 50 with the female thread jig 300, and FIG. 5(b) shows the state after engaging to the metallic shell 50 with the female thread jig 300. As shown in FIG. 5(a), the metallic shell 50 is screwed into the through hole 320 from the flange 330b towards the flange 330a to thereby engage with the female thread jig 300. As a result, as shown in FIG. 5(b), the ground electrode 30 projects from the flange 330a. The deviation of the ground electrode 30 is measured by observing the female thread jig 300 with which the metallic shell 50 is engaged from the ground electrode 30 side. In the first embodiment, a plane including the reference surface 332 of the flange 330a where the groove 350 is formed, i.e., a plane including the reference surface 332 of the flange 330a and the front end face 57 of the metallic shell 50 in the state where the metallic shell 50 is engaged with the female thread jig 300, is referred to as a measurement face 360.

Figure 6:
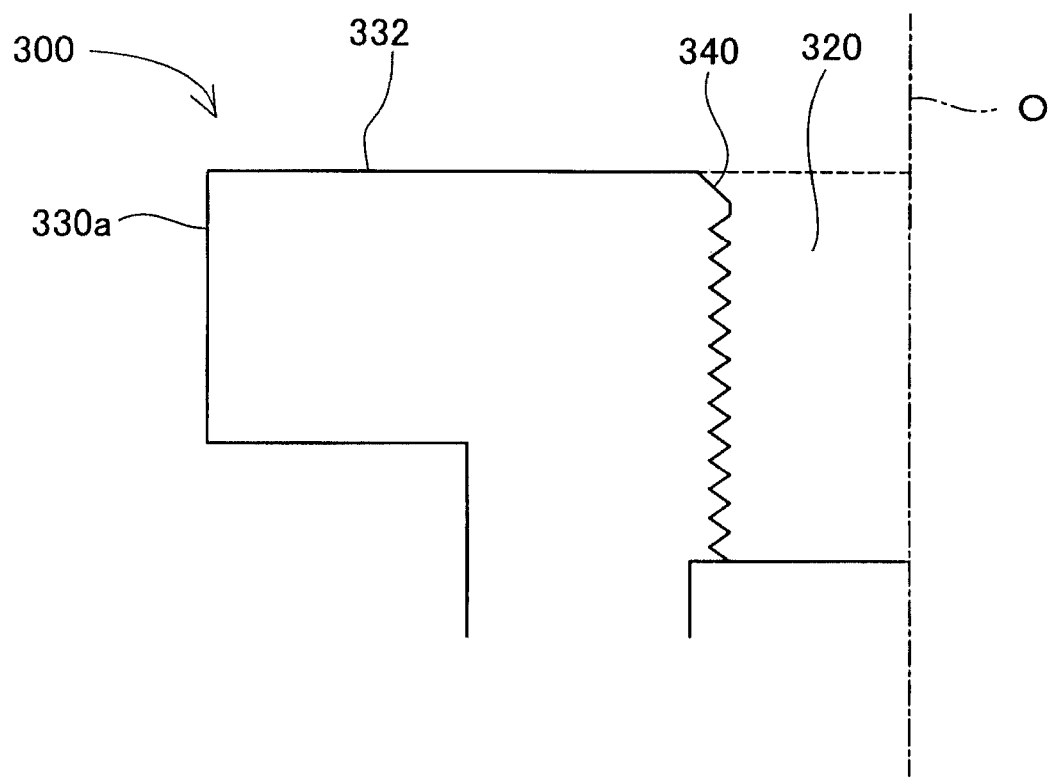
FIG. 6 is a sectional view of the female thread jig 300 taken along a line A-A in FIG. 4(a).

FIG. 6 is a sectional view of the female thread jig 300 taken along a line A-A in FIG. 4(a). As shown in FIG. 6, the flange 330a has a chamfered portion 340 where a boundary (a corner used as a connecting part between the reference surface 332 and the through hole 320) between the reference surface 332 and the through hole 320 is slightly chamfered. Various chamfering processes, such as a chamfering and a rounding can be applied. The metallic shell 50 is engaged with the female thread jig 300.

Returning to FIG. 2, the measurement face 360 is observed while the metallic shell 50 is engaged with the female thread jig 300, and the deviation of the ground electrode 30 from the optimal igniting position is measured (Step S22).

Figure 7:
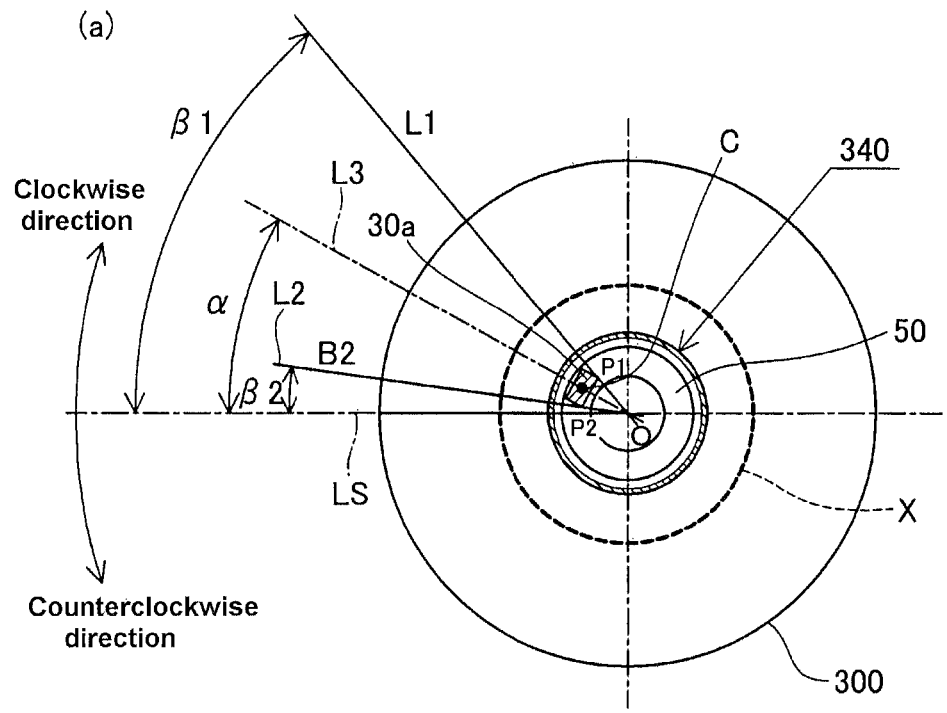
FIG. 7 is an explanatory view showing an deviation of the ground electrode 30 deviated from the optimal igniting position O1 according to the first embodiment.
Figure 7:
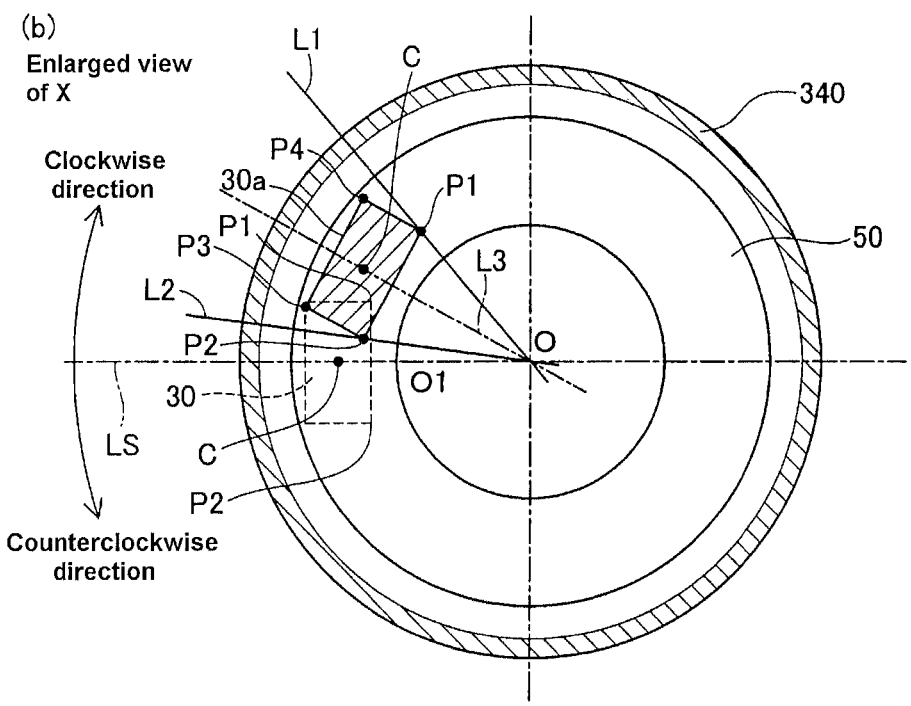

FIG. 7 is an explanatory view showing an deviation of the ground electrode 30 deviated from the optimal igniting position in the first embodiment. FIG. 7(a) is a top view of the measurement face 360 while the metallic shell 50 is engaged with the female thread jig 300 in the first embodiment. FIG. 7(b) is an enlarged view of an X portion in FIG. 7(a). In FIGS. 7(a) and 7(b), a face 30a is a front end face of the ground electrode 30. In this specification, the face 30a is referred to as a front end face 30a. In FIG. 7(a) and FIG. 7(b), points P1, P2, P3 and P4 represent four corners of the front end face 30a of the ground electrode 30 assuming an approximately rectangular shape. A center C expresses the center of the front end face 30a of the ground electrode 30, The axis O shows an axis (the axis of the metallic shell 50) of the female thread jig 300. The groove 350 is formed on the flange 330a of the female thread jig 300 so as to align with a straight line which passes through the axis O. Thus, a position that the center C of the front end face 30a of the ground electrode 30 aligns with the straight line passing through the groove 350 is the optimal igniting position of the ground electrode 30. In FIG. 7(a) and FIG. 7(b), a reference straight line "LS" serves as a straight line which passes the groove 350 and the axis O. Further, a reference point O1 in the circumferential direction corresponds to an intersection at the groove 350 side which is one of intersections of the reference straight line "LS" and a ridge formed by the front end face and the inner circumferential face of the metallic shell 50. Furthermore, the reference point O1 in the circumferential direction serves as an original point in the circumferential direction which centers around the axis O. In the first embodiment, the reference point O1 is the optimal igniting position. Henceforth, the reference point O1 is also referred to as the optimal igniting position O1 in this specification. In FIGS. 7(a) and 7(b), in the circumferential direction centering on the axis O of the female thread jig 300 (axis of the metallic shell 50), a clockwise direction expresses positive direction in the drawings, and a counterclockwise direction expresses a negative direction. In addition, in FIG. 7(b), a rectangular frame with a dashed line shows the ground electrode 30 in the optimal igniting position O1 when the ground electrode 30 is located on the front end face 57 of the metallic shell 50.

In the first embodiment, in order to measure the deviation of the ground electrode 30 from the optimal igniting position O1, the axis O of the metallic shell 50, the predetermined first measuring point P1 and the predetermined second measuring point P2 on the front end face 30a of the ground electrode 30 are detected. Then, a circumferential angle "β1" defined by the reference straight line LS and a straight line L1 that connects the axis O and the first measuring point P1, and a circumferential angle "β2" defined by the reference straight line LS and a straight line L2 that connects the axis O and the second measuring point P2 are measured. More particularly, using the following equation, a circumferential angle "α" defined by the straight line L1 and a third straight line L3 that connects the axis O and the center C of the front end face of the ground electrode 30 is calculated. In addition, in the first embodiment, the circumferential angles "β1" and "β2" correspond to "first angle information" and "second angle information", respectively, in the claims, and the circumferential angle "α" corresponds to "third angle information" in the claims.

$$\alpha = (\beta_1 + \beta_2)/2 \quad \text{(Equation 1)}$$

Since the reference point O1 in the circumference direction corresponds to the center C of the ground electrode 30 when the ground electrode 30 is positioned in a target position (optimal igniting position O1), the circumferential angle "α" calculated using Equation 1 is the deviation of the ground electrode 30 from the optimal igniting position.

In the first embodiment, two points close to the axis O (i.e., inner points) in the four points P1, P2, P3, and P4 of the front end face 30a of the ground electrode 30 serve as the first measuring point P1 and the second measuring point P2. The measuring points are not limited to the first measuring point P1 and the second measuring point P2, and but may be any point on the front end face 30a of the ground electrode 30. The measuring point is preferably on the outer edge of the front end face 30a because it is easily detected. The first measuring point and the second measuring point may be a point located on a side of the third straight line which connects the axis O of the metallic shell 50 and the center C of the front end face 30a of the ground electrode 30, and a point located on the other side of the third straight line.

Figure 8:
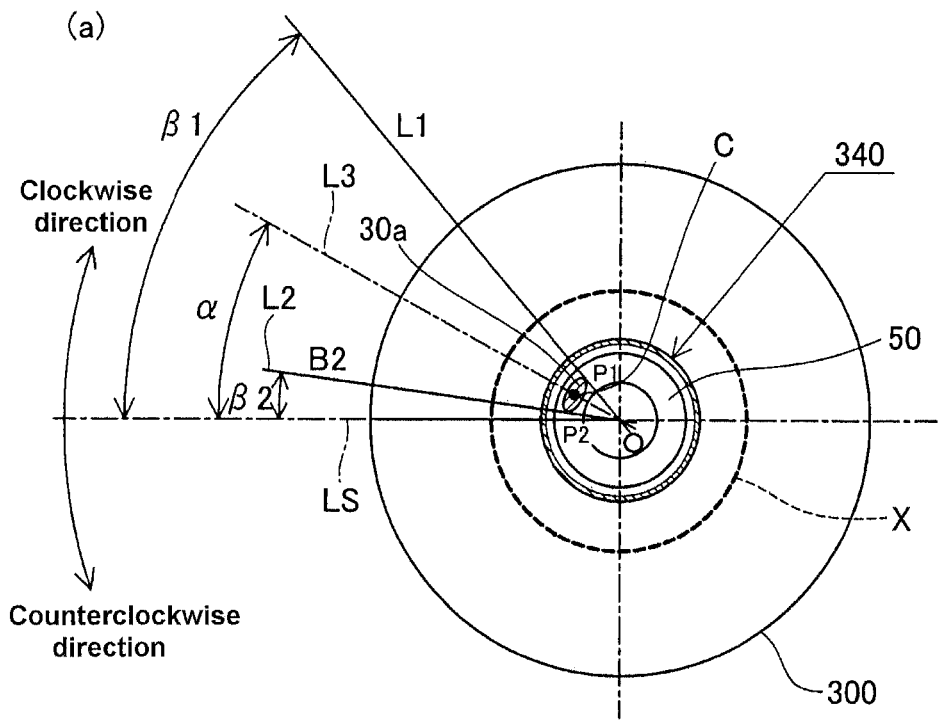
FIG. 8 is an explanatory view showing how to define a first measuring point, a second measuring point and the others.
Figure 8:
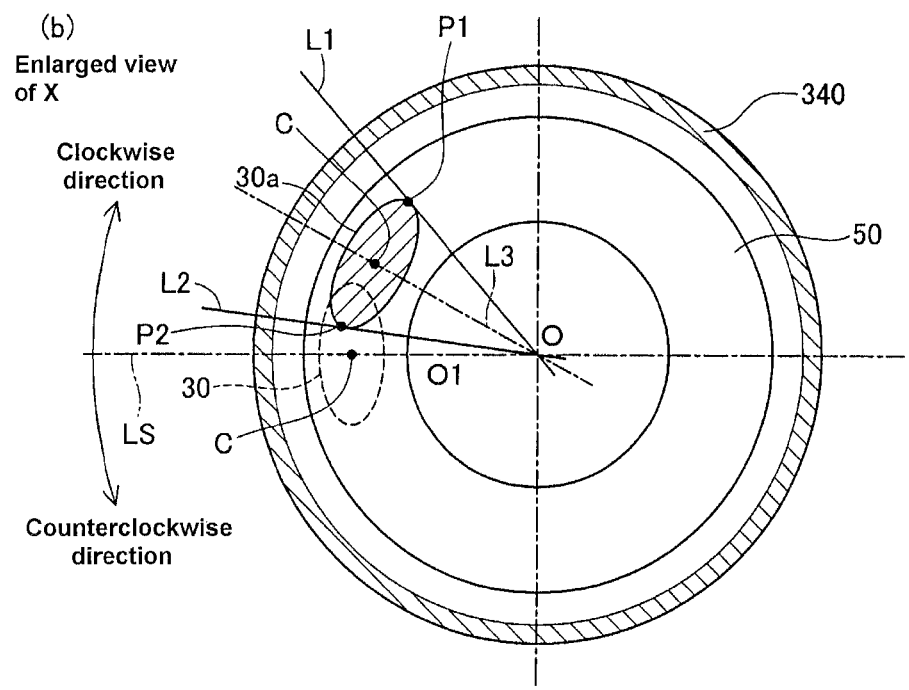

FIG. 8 is an explanatory view showing how to define a first measuring point, a second measuring point and the others. FIGS. 8(a) and 8(b) correspond to FIGS. 7(a) and 7(b), respectively. FIG. 7, prescribes two points close to the axis O among the four vertices P1, P2, P3 and P4 of the front end face 30a of the approximately rectangular ground electrode 30 as the first measuring point P1 and the second measuring point P2. However, the first measuring point and the second measuring point can be defined by another method. For example, as shown in FIG. 8(a), the first measuring point P1 may be a contact where the first straight line L1 that passes the axis O is circumscribed with the outer edge of the front end face 30a, and the second measuring point P2 may be a contact where the second straight line L2 is circumscribed with the outer edge of the front end face 30a. As shown in FIG. 8(b), at this time, the first measuring point P1 and the second measuring point P2 are defined so that one measuring point is located on one side of third straight line L3 that connects the axis O of the metallic shell 50 to the center C of the front end face 30a of the ground electrode 30, and the other measuring point is located on the other side of the third straight line L3. According to the prescription of the measuring points shown in FIGS. 8(a) and 8(b), even if the front end face 30a assumes a round shape, an ellipse shape or the like which do not have a corner, the deviation of the ground electrode 30 from the optimal igniting position O1 can be measured based on the circumferential angle β1 formed by the reference straight line LS and the first straight line L1, and the circumferential angle β2 formed by the reference straight line LS and the second straight line L2. That is, according to the prescription of the measuring point shown in FIG. 8, the deviation can be measured regardless of the shape of the front end face 30a of the ground electrode 30.

Figure 9:
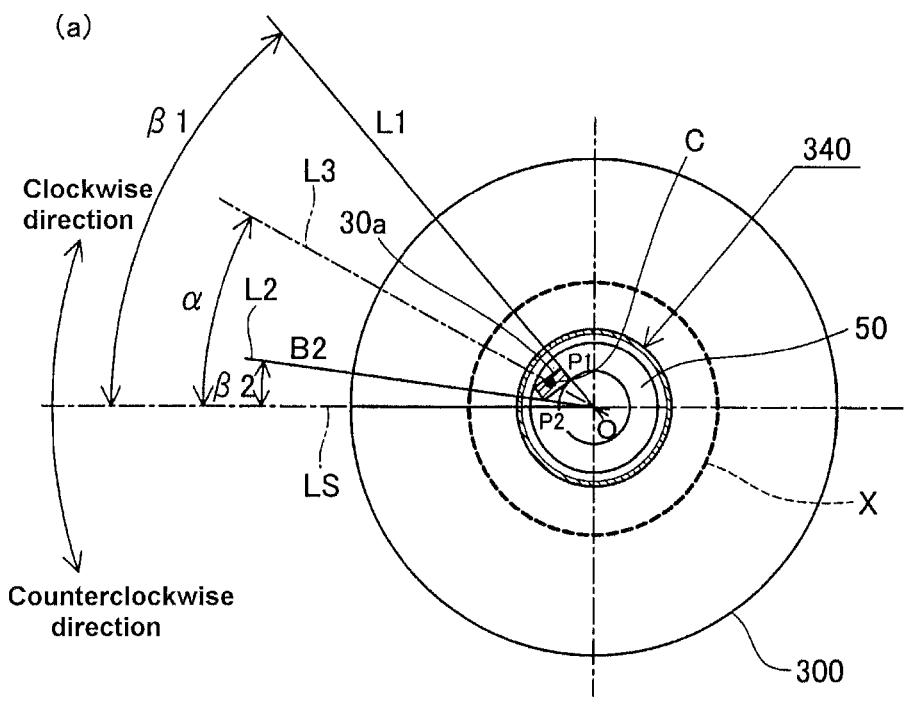
FIG. 9 is an explanatory view showing the rectangular ground electrode welded in an inclined manner with respect to an axis of the metallic shell.
Figure 9:
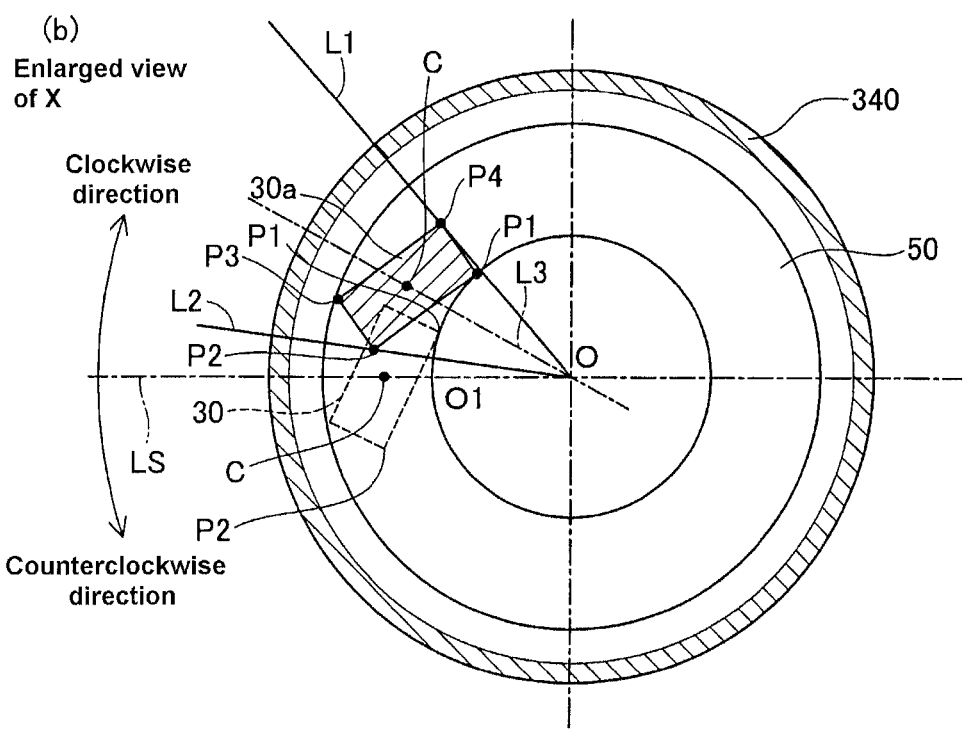

FIG. 9 is an explanatory view which illustrated the state where the rectangular ground electrode is welded to the axis of the metallic shell in an inclined manner. FIGS. 9(a) and 9(b) correspond to FIGS. 7(a) and 7(b), respectively. As shown in FIGS. 9(a) and (b), when the rectangular ground electrode 30 is welded to the axis O of the metallic shell 50 in the inclined manner, the distance from the axis O to the vertex P2 is similar to the distance from the axis O to the vertex P4, rather than the distance from the axis O to the vertex P1 of the front end face 30a of the ground electrode 30. Therefore, when the vertex P4 and the vertex P2 of the front end face 30a of the ground electrode 30 are defined as the first measuring point and the second measuring point, respectively, the third straight line L3 that connects the axis O of the metallic shell 50 to the center C of the front end face 30a of the ground electrode 30 can be accurately specified, compared to the case where the vertex P1 and the vertex P2 both located inner side are defined as the first measuring point and the second measuring point, respectively. When the prescription of the measuring point shown in FIGS. 8(a) and 8(b) is applied to the measurement of the deviation of the ground electrode 30 in FIGS. 9(a) and 9(b), the vertex P4 and the vertex P2 of the front end face 30a of the ground electrode 30 can be defined as the first measuring point P4 and the second measuring point P2, respectively, the circumferential angle "α" formed between the third straight line L3 and the reference straight line LS can be accurately obtained based on the circumferential angles β1 and β2. As a result, the measurement accuracy of the deviation can be improved.

The measuring step of the deviation of the ground electrode 30 from the optimal igniting position O1 in the first embodiment, such as the detections of the first measuring point P1 and the second measuring point P2, and the axis O, will be described in detail. This measuring step corresponds to Step S22 in FIG. 3. In the first embodiment, the deviation is measured using a projector 400.

First, the measurement face 360 is projected by the projector 400 while the metallic shell 50 is engaged with the female thread jig 300 to obtain a projection image of the projected measurement face 360 (Step S30).

Figure 10:
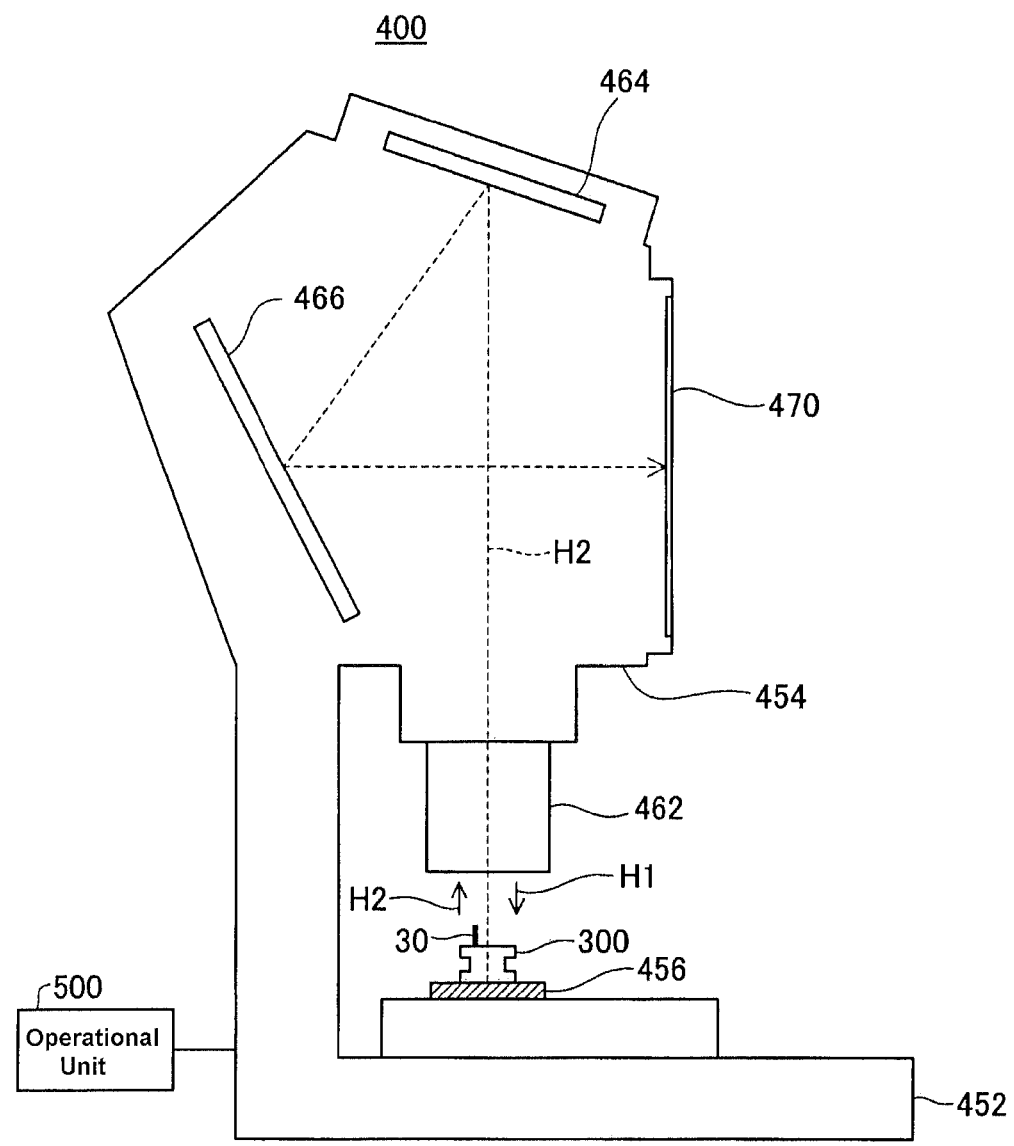
FIG. 10 is a diagram showing a projector 400 according to the first embodiment.

FIG. 10 is a diagram showing the projector 400 according to the first embodiment. The projector 400 is equipped with a base 452 and a head 454 disposed on an upper side of the base 452. A mount stage for measuring object 456 is formed on the base 452. The mount stage for measuring object 456 includes a mark (not illustrated) which shows a previously determined position of the female thread jig 300. A person allocates the female thread jig 300 on the mount stage for measuring object 456 according to the mark. The head 454 is equipped with light source (not illustrated), an optical system including a projection lens 462 and flat mirrors 464, 466, and a screen 470 formed in the front of the head 454.

When light H1 is irradiated from the light source, which is not illustrated, the light H1 is reflected by the measurement face 360. This reflected light is irradiated to the screen 470 through the projection lens 462 and the flat mirrors 464, 466, as shown in an arrow H2. The projection image of the measurement face 360 explained in FIG. 7(a) is projected on the screen 470. A data showing this projection image is generated and transferred to an operational unit 500. In addition, the projection image data is the same image as the top view of FIG. 7.

The operational unit 500 analyzes the transferred projection image data and detects the axis O of the metallic shell 50 (Step S32). More particularly, the operational unit 500 analyzes the projection image data and detects the chamfered portion 340. Since the chamfered portion 340 is formed in slope against the light irradiated from the projector 400, it is reflected as a shadow in the projection image. Then, the operational unit 500 detects a circular shadow to calculate the center of the circle. The thus-detected center of the circle corresponds to the axis O of the metallic shell 50. Since the metallic shell 50 is engaged with the through hole 320 of the female thread jig 300, the axis of the female thread jig 300 serves as the axis O of the metallic shell 50. Since a portion shown in shadow can be easily detected, it is advantageous that the axis O is readily detected by chamfering.

Next, the operational unit 500 analyzes the projection image data, and detects the first measuring point P1 and the second measuring point P2 of the ground electrode 30 (Step S34). A measuring point is detected such that the projection image data is analyzed to find the edge of the ground electrode 30. Since an outer edge and a corner are easily detected, the detection of each measuring point is readily conducted.

The operational unit 500 measures the circumferential angles $\beta 1$ and $\beta 2$ of the first measuring point P1 and the second measuring point P2 based on the optimal igniting position O1 (Step S36). More particularly, as shown in FIG. 7(a), the operational unit 500 measures the circumferential angle $\beta 1$ between the reference straight line LS and the first straight line L1, and the circumferential angle $\beta 2$ between the reference straight line LS and the second straight line L2.

The operational unit 500 applies the circumferential angles $\beta 1$ and $\beta 2$ to Equation 1 to thereby calculate the circumferential angle "$\alpha$" which serves as the deviation from the optimal igniting position O1 of the ground electrode 30 (Step S38).

According to the measuring method of the first embodiment, the deviation of the ground electrode 30 from the optimal igniting position O1 is measured based on the circumferential angles $\beta 1$, $\beta 2$ formed between the reference straight line LS and straight lines L1, L2 which connect the axis O of the metallic shell 50 and the measuring points P1, P2, respectively. Therefore, the deviation of a joint position of the ground electrode 30 from the optimal igniting position O1 can be confirmed in numerical terms. Thus, an accuracy evaluation of the deviation of the joint position of the ground electrode 30 can be improved, and a variation in quality of the metallic shell 50 can be prevented.

Further, according to the measuring method of the first embodiment, in the four vertices P1, P2, P3, P4, of the front end face of the rectangular ground electrode 30, two inner points P1, P2 close to the axis O of the metallic shell 50 are used as the first measuring point and the second measuring point, respectively. Therefore, the distance from the first measuring point P1 to the axis O of the female thread jig 300 and the distance from the second measuring point P2 to the axis O of the female thread jig 300 are mostly the same. That is, since the first measuring point P1 and the second measuring point P2 are generally positioned on a concentric circle, the circumferential angles $\beta 1$, $\beta 2$ are accurately obtained. As a result, a measurement accuracy of the deviation can be improved.

When two inner points P1, P2 close to the axis O of the metallic shell 50 are employed as the first measuring point and the second measuring point, respectively, the difference between the circumferential angles $\beta 1$, $\beta 2$ becomes large compared to the case where the points P3, P4, which are outward and far from the axis O of the metallic shell 50, are employed as the first measuring point and the second measuring point. Therefore, the circumferential angle "$\alpha$" between the third straight line L3 and the reference straight line LS is accurately calculated. As a result, improvement in measurement accuracy of the deviation is achievable.

Furthermore, according to the measuring method of the first embodiment, the axis O of the metallic shell 50 is detected based on the chamfered portion 340 formed in the boundary of the reference surface 332 of the female thread jig 300 and the through hole 320. Since the shadow of the chamfered portion 340 is reflected on the projection image of the measurement face, the outline of the through hole 320 can be accurately detected. Therefore, the center of the through hole 320, i.e., the axis O of the metallic shell 50 is accurately detected from the outline of the through hole 320. Thus, the measurement accuracy of the deviation from the joint position of the ground electrode 30 can be improved.

Moreover, according to the measuring method of the first embodiment, each detection (detections of the first measuring point P1, the second measuring point P2, and the axis O) is performed using the projector 400. Therefore, the detection accuracy can be while a user's burden is reduced. As a result, the measurement accuracy of the deviation is improved.

According to the measuring method of the first embodiment, the metallic shell 50 is engaged with the female thread jig 300 with the generally same torque as the torque used at the time of mounting the metallic shell 50 on an internal combustion engine. Therefore, it is possible to measure the deviation of the ground electrode 30 from the optimal igniting position in almost the same state where the metallic shell 50 is mounted on an internal combustion engine. As a result, the measurement accuracy of the deviation can be improved.

Further, according to the method for manufacturing the spark plug 100 of the first embodiment, the spark plug 100 is manufactured such that the ceramic insulator 10 is fitted to the metallic shell 50 in which the deviation of the joint position of the ground electrode 30 from the optimal igniting position is judged to be within an allowable range. Therefore, the spark plug 100 can be manufactured with few variations in quality.

B. Second Embodiment

In the first embodiment, the deviation of the ground electrode 30 is measured with the numerical terms by analyzing the image data of the projection view. In the second embodiment, an inspector conducts visual inspection and judges whether or not the joint position of the ground electrode 30 is within a predetermined allowable angle range. Thereafter, the measurement of the deviation is conducted only to the metallic shell 50 having the joint position of the ground electrode 30 within the allowable angle range. In the second embodiment, the deviation of the ground electrode 30 is measured based on the allowable angle range indicated on a measurement face of the female thread jig.

Figure 11:
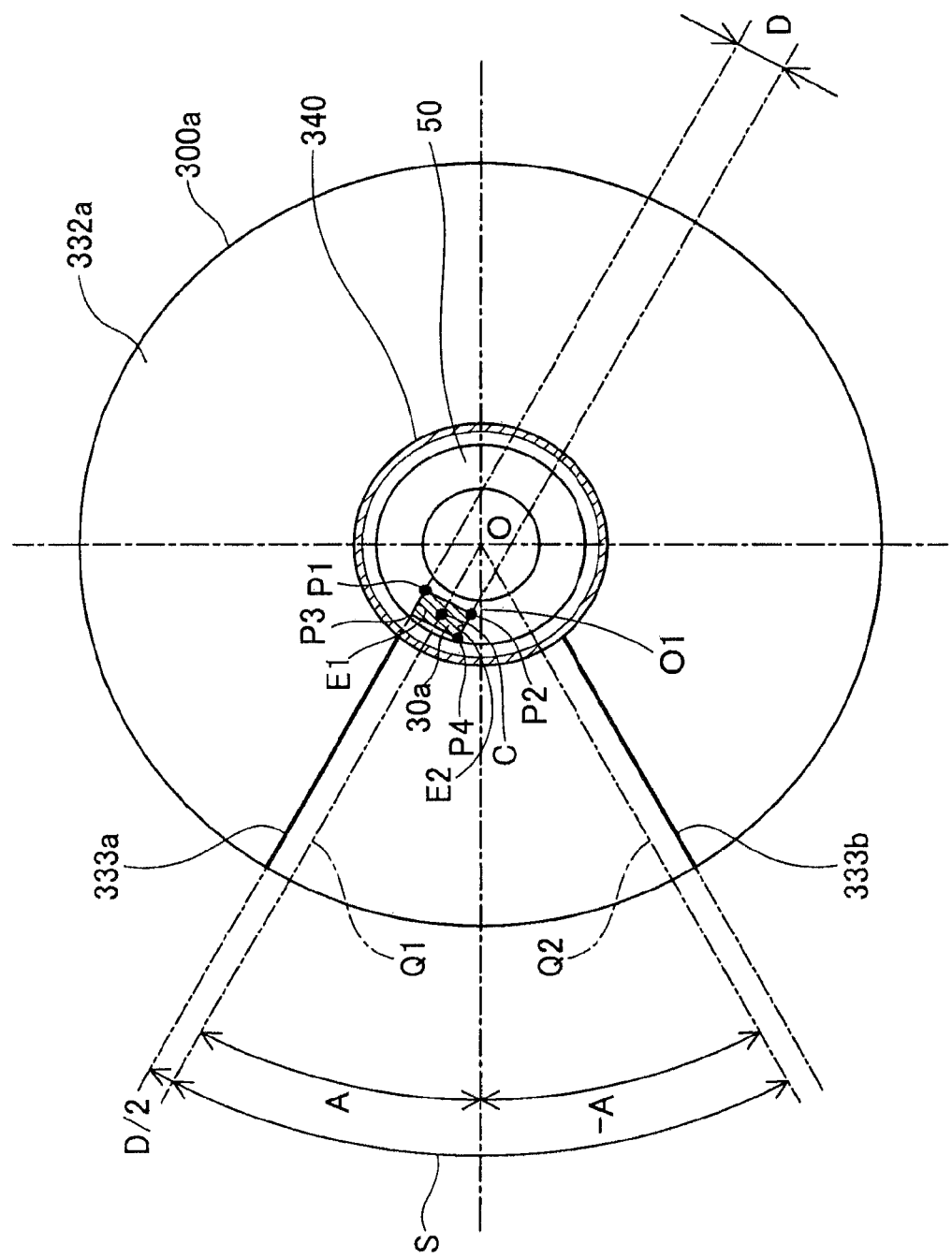
FIG. 11 is a top view showing a measurement face 360a of a female thread jig 300a according to a second embodiment.

B1. Measuring Method of Deviation of Ground Electrode from Joint Target Position:

FIG. 11 is a top view showing the measurement face 360a of the female thread jig 300a in the second embodiment. FIG. 11 shows a state where the metallic shell 50 is engaged with the female thread jig 300a. An allowable angle range "S" is a predetermined angle defined by the groove 333a and the groove 333b. In FIG. 11, allowable angles "A" and "−A" correspond to a limit angle of the center C of the ground electrode 30. That is, the allowable angles "A", "−A" are the circumferential angles of the center C when the ground electrode 30 is joined in an allowable area that contributes to a high-quality spark plug 100.

In the second embodiment, the groove 333a and the groove 333b showing the allowable angle range S are formed in a position including a width of the ground electrode 30. More particularly, the groove 333a is formed along an extensive line of an edge E1 of the front end face 30a of the ground electrode 30 in the circumferential direction at a positive side when the center C of the ground electrode 30 is located within the allowable angle "A". Similarly, the groove 333b is formed along an extensive line of an edge E2 of the front end face 30a of the ground electrode 30 in the circumferential direction at a negative side when the center C of the ground electrode 30 is located within the allowable angle "−A". In other words, the groove 333a is formed at the positive side in the circumferential direction by D/2 (D: a circumferential width of the front end face of the ground electrode 30) from a straight line Q1 that expresses the allowable angle A. The groove 333b is formed at the negative side in the circumferential direction by D/2 from a straight line Q2 that expresses the allowable angle −A. As a result, the allowable angle range "S" is defined as a range where the width "D" of the front end face of the ground electrode 30 in the circumferential direction is added to the range from the allowable angle "A" to the allowable angle "−A".

In the second embodiment, similar to the first embodiment, the measurement face 360a is projected by the projector while the metallic shell 50 is engaged with the female thread jig 300. Based on the thus-obtained projection image of the measurement face 360a, an inspector visually inspects the deviation of the ground electrode 30. Although no illustration is presented, as is similar to the case of the chamfered portion 340, the groove 333a and the groove 333b are in shadow in the projection view when the measurement face 360a is projected by the projector 400. The inspector visually inspects the projection image and confirms whether or not the edge E1 of the front end face 30a of the ground electrode 30 is located at the negative side in the circumferential direction with respect to the groove 333a, and also checks whether or not the edge E2 of the front end face 30a of the ground electrode 30 is located at the positive side in the circumferential direction with respect to the groove 333b. When the edge E1 is located at the negative side in the circumferential direction with respect to the groove 333a as well as the edge E2 is located at the positive side in the circumferential direction with respect to the groove 333b, the deviation of the ground electrode 30 is within the allowable angle range "S". In this case, the quality of the metallic shell 50 is judged to be acceptable. When the edge E1 is located at the positive side in the circumferential direction with respect to the groove 333a, or the edge E2 is located at the negative side in the circumferential direction with respect to the groove 333b, the deviation of the ground electrode 30 is beyond the allowable angle range "S". In this case, the quality of the metallic shell 50 is judged to be a defect. Only the accepted metallic shells 50 having the deviation of the joint position of the ground electrode 30 are subjected to the measurement by the operational unit 500.

According to the measuring method of the second embodiment, before the measurement of the deviation by the operational unit 500, the inspector judges whether or not the joint position of the ground electrode 30 is within the allowable angle range "S", and only the accepted metallic shells 50 are subjected to the measurement of the deviation by the operational unit 500. Therefore, the defect metallic shell 50 judged by the visual inspection is discarded without measuring the deviation. Thus, it is possible to improve a manufacturing speed of the metallic shell 50.

Conventionally, a range from the allowable angle "A" to the allowable angle "−A" was generally used as an allowable angle range. However, since an inspector could not clearly find the center C of the front end face 30a of the ground electrode 30, a pass/failure judgment was difficult through the visual inspection, inspecting near the upper and the lower borders of the allowable angle range S. Since this caused variation in the pass/failure results, the variation in quality of the metallic shell 50 occurred. According to the measuring method of the second embodiment, the allowable angle range "S" is expressed as a range where the width "D" of the front end face of the ground electrode 30 in the circumferential direction is added to the range from the allowable angle "A" to the allowable angle "−A". Therefore, the pass/failure judgment around the borders of the allowable angle range "S" is made using the edge E1 and the edge E2 of the ground electrode 30. As a result, improvement in accuracy of the pass/failure judgment through the visual inspection is achievable.

C. Modification (1) Although the deviation is measured by the operational unit 500 in the first embodiment, it may be measured by a visual inspection. In this case, an inspector may measure the circumferential angles β1 and β2 using the screen 470, of the projector 400 in which a scale representing the axis O, the reference straight line LS and the circumferential angles is provided to thereby calculate the circumferential angle "α".

(2) In the first embodiment and the second embodiment, the projector 400 is used. However, a microscope may be used instead of the projector 400.

(3) In the second embodiment, the judgment whether or not the ground electrode 30 is located in the allowable angle range "S" is determined based on the projection image obtained by the projector 400. However, the judgment may be made by an inspector through visual inspection without the projector 400. In this case, the projector 400 and the operational unit 500 is used for measuring the deviation in the only metallic shells 50 where the ground electrode 30 is located within the allowable angle range "S" Therefore, the burden of the inspector can be reduced because s/he does not necessary to install all the metallic shells 50 on the projector 400.

The present invention is not particularly limited to the embodiments described above but may be changed or modified in various ways within the scope of the invention.

DESCRIPTION OF REFERENCE NUMERALS

5: gasket
6: ring member
8: plate packing
9: talc
10: the ceramic insulator
12: axial bore
13: leg portion
15: step portion
17: front trunk portion
18: rear trunk portion
19: flange
20: center electrode
30: ground electrode
40: terminal fitting
50: metallic shell 51: tool engagement portion
52: mount screw portion
53: caulking portion
54: sealing portion
55: seating portion
56: step portion
58: buckle portion
59: screw neck
62: projection lens
64: plane mirror
100: spark plug
200: engine head
201: thread mounting hole
205: opening perimeter edge
300: female thread jig
300a: female thread jig
310: main body portion
320: through hole
330a: flange
330b: flange
333a, 333b: groove
340: chamfered portion
350: groove
360: measurement face
360a: measurement face
400: projector
452: base
454: head
456: mount stage for measuring object
462: projection lens
470: screen
500: operational unit

The invention claimed is:

1. A method for measuring a deviation of a member from a joint target position in a spark plug, comprising the steps of:
joining a member to a measuring object having an end face at a position other than an axis of the measuring object on the end face;
engaging the measuring object with a female thread jig having a reference surface in which a reference portion serving as a reference for the joint target position of the member in the measuring object is formed;
detecting at least one predetermined measuring point in a projection image of a front end portion of the member when the front end portion is projected on a flat measurement face including the reference surface, while the measuring object is engaged with the female thread jig;
detecting the reference portion on the measurement face; and
measuring a deviation of the member from the joint target position based on an angle between a straight line that connects the axis of the measuring object to the measuring point on the measurement face and a reference straight line that connects the axis of the measuring object to the reference portion on the measurement face,
wherein the deviation is confirmed in numerical terms by analyzing and calculating data obtained from the projection image.

2. The measuring method according to claim 1, wherein the measuring object is a metallic shell for a spark plug, and the member is a ground electrode joined to the metallic shell.

3. The measuring method according to claim 1, wherein measuring points include a predetermined first measuring point and a second measuring point on an outer edge of the projection image of the front end portion, the method for measuring a deviation further comprising the steps of:
calculating a center of the projection image of the front end portion based on: a piece of first angle information representing an angle between the reference straight line and the first straight line that connects the axis of the measuring object and the first measuring point, and a piece of second angle information representing an angle between the reference straight line and the second straight line that connects the axis of the measuring object and the second measuring point;
finding a third straight line that connects the axis of the measuring object to the thus-calculated center of the projection image of the front end portion, and:
measuring the deviation of the member from the joint target position based on a third angle information representing an angle between the reference straight line and the third straight line.

4. The measuring method according to claim 3, wherein the projection image of the front end portion assumes an approximately rectangular shape having four vertices, and
wherein the first measuring point and the second measuring point are represented by two vertices that are closer to the axis of the measuring object than other vertices found in the projection image of the front end portion.

5. The measuring method according to claim 3, wherein the first straight line and the second straight line are circumscribed at different locations on the outer edge of the projection image of the front end portion, respectively.

6. The measuring method according to claim 1, wherein the axis of the measuring object is detected before the measurement of the deviation of the member from the joint target position, based on a chamfered portion formed in a boundary of the reference surface of the female thread jig and a thread hole.

7. The measuring method according to claim 1, wherein, in the engaging step, the measuring object is engaged with the female thread jig with a predetermined torque.

8. A method for manufacturing a spark plug comprising the steps of:
joining a ground electrode to an end face of a cylindrical metallic shell;
engaging the metallic shell joined to the ground electrode with a female thread jig having a reference surface where a reference portion that serves as a reference of a joint target position of the ground electrode in the metallic shell is formed beforehand;
detecting at least one predetermined measuring point in a projection image of a front end portion of the ground electrode when the front end portion is projected on a flat measurement face including the reference surface, while the metallic shell is engaged with the female thread jig;
detecting the reference portion on the measurement face;
measuring a deviation of the ground electrode from the joint target position based on an angle between a straight line that connects the axis of the metallic shell to the measuring point on the measurement face and a reference straight line that connects the axis of the metallic shell to the reference portion on the measurement face;
judging whether or not the measured deviation is within a predetermined allowable range;

fitting an insulator where a center electrode and a terminal fitting are assembled to the metallic shell in which the deviation is judged to be within the allowable range; and forming a front end of the ground electrode so as to face the center electrode, wherein the deviation is confirmed in numerical terms by analyzing and calculating data obtained from the projection image.

9. The measuring method according to claim 1, wherein the deviation is measured using a scale.

10. The measuring method according to claim 9, wherein the scale is an operational unit that analyzes and calculates projection image data.

11. The measuring method according to claim 10, further comprising the steps of:

generating projection image data;

analyzing the projection image data to detect the predetermined measuring point; and analyzing the projection image data to detect the reference portion on the measurement face.

* * * * *